United States Patent [19]
Meyer, Jr. et al.

[11] Patent Number: 6,060,884
[45] Date of Patent: May 9, 2000

[54] METHOD AND APPARATUS FOR MEASURING ELECTROMAGNETIC PROPERTIES OF MATERIALS IN BOREHOLE ENVIRONS AND SIMULTANEOUSLY DETERMINING THE QUALITY OF THE MEASUREMENTS

[76] Inventors: Wallace Harold Meyer, Jr., 18307 Mahagoney Forest, Spring, Tex. 77379; Larry Wayne Thompson, 5330 Montego Cove, Willis, Tex. 77378; Macmillan M. Wisler, 1314 Golden Bear, Kingwood, Tex. 77339; Jian-Quan Wu, 5100 FM 1960 West, Apt. 1408, Houston, Tex. 77069

[21] Appl. No.: 09/031,493

[22] Filed: Feb. 26, 1998

Related U.S. Application Data

[63] Continuation-in-part of application No. 08/675,178, Jul. 3, 1996, abandoned, which is a continuation of application No. 08/212,257, Mar. 14, 1994, abandoned.

[51] Int. Cl.$^7$ .................................................. G01V 3/10
[52] U.S. Cl. ................................. 324/341; 702/7
[58] Field of Search ................................. 324/323, 324, 324/332, 334, 335, 336, 338–341; 73/152.01, 152.02, 152.03, 152.05; 702/6, 7, 11

[56] References Cited

U.S. PATENT DOCUMENTS

| | | | |
|---|---|---|---|
| 3,891,916 | 6/1975 | Meador | 324/338 |
| 4,216,536 | 8/1980 | More | 367/83 |
| 4,308,499 | 12/1981 | Thierbach et al. | 324/338 |
| 4,703,277 | 10/1987 | Kenyon et al. | 324/323 |
| 4,720,681 | 1/1988 | Sinclair et al. | 324/339 |
| 4,730,161 | 3/1988 | Cox et al. | 324/341 |
| 4,780,679 | 10/1988 | Kenyon et al. | 324/341 |
| 4,786,873 | 11/1988 | Sherman | 324/323 |
| 4,873,488 | 10/1989 | Barber et al. | 324/339 |
| 4,899,112 | 2/1990 | Clark et al. | 324/338 |
| 4,968,940 | 11/1990 | Clark et al. | 324/338 |
| 5,065,099 | 11/1991 | Sinclair et al. | 324/339 |
| 5,081,419 | 1/1992 | Meador et al. | 324/338 |

(List continued on next page.)

FOREIGN PATENT DOCUMENTS

| | | |
|---|---|---|
| 0375549 | 6/1990 | European Pat. Off. . |
| 8401439 | 4/1984 | WIPO . |
| 9307514 | 4/1993 | WIPO . |

OTHER PUBLICATIONS

"Inversion of 2 MHz Propagation Resistivity Logs," W.H. Meyer, *SPWLA 33d Annual Logging Symposium* Jun. 14–17, 1992.

"Measurement of Dielectric Response of Water Saturated Rocks", Taherian, Kenyon & Safinya, 55 *Geophysics* 12 (Dec. 1990) p 1530–1541, 6 Figs, 2 Tables.

"Effects of Arbitrarily Shaped Boreholes and Invasion on Propagation Resistivity Measurements in Drilling Horizontal Wells" Jian Qun Wu et al. *Progress in Electromagnetic Research Symposium*, Pasadena, California, Jul. 14, 1993.

"Effects of Eccentering MWD Tools in Electromagnetic Resistivity Measurements," Jian Qun Wu et al., *SPWLA 31st Annual Logging Symposium*, Jun. 24–27, 1990.

*Primary Examiner*—Jay Patidar
*Attorney, Agent, or Firm*—Madan, Mossman & Sriram, P.C.

[57] ABSTRACT

A wave propagation measurement-while-drilling system is used to measure selected formation and borehole parameters of interest and simultaneously provide indications of the quality of the selected measurements. One or more transmitter-receiver pairs are employed with the transmitter components operating at one or more frequencies. A model of the response characteristics of the borehole instrument is also employed. By using a redundant subset of the measurements, the parameters of interest are determined and an expected value of the remaining measurements is made. A comparison of the actual and expected values of the remaining measurements serves as a quality control check on the equipment and on the accuracy of the model.

17 Claims, 2 Drawing Sheets

U.S. PATENT DOCUMENTS

| | | | |
|---|---|---|---|
| 5,089,989 | 2/1992 | Schmidt et al. | 367/35 |
| 5,144,245 | 9/1992 | Wisler | 324/338 |
| 5,157,331 | 10/1992 | Smith | 324/338 |
| 5,157,605 | 10/1992 | Chandler et al. | 324/339 |
| 5,187,661 | 2/1993 | Sinclair | 324/339 |
| 5,210,495 | 5/1993 | Hapashy et al. | 324/338 |
| 5,278,507 | 1/1994 | Bartel et al. | 324/338 |
| 5,345,179 | 9/1994 | Habashy et al. | 324/338 |
| 5,367,262 | 11/1994 | Manning | 324/338 |
| 5,402,068 | 3/1995 | Meador et al. | 324/338 |

METHOD AND APPARATUS FOR MEASURING ELECTROMAGNETIC PROPERTIES OF MATERIALS IN BOREHOLE ENVIRONS AND SIMULTANEOUSLY DETERMINING THE QUALITY OF THE MEASUREMENTS

REFERENCE TO RELATED APPLICATIONS

This application is a continuation-in-part of application Ser. No. 08/675178, filed on Jul. 3, 1996, now abandoned, which was a continuation of application Ser. No. 08/212,257 filed on Mar. 14, 1994, now abandoned.

FIELD OF THE INVENTION

This invention is related to the determination of log quality using redundant measurements.

BACKGROUND OF THE INVENTION

This invention is directed toward the measure of geophysical parameters of earth formations penetrated by a borehole. The invention employs propagation resistivity techniques spaced transmitters operating at different frequencies and a plurality of longitudinally spaced receivers. An electromagnetic wave is propagated from the transmitting antenna coil into the formation in the vicinity of the borehole and is detected as it pass the receiving antennas. The basic or "raw" parameters measured by the receivers are the phase and the amplitude of the passing wave. The downhole instrument is conveyed along the borehole making a plurality of raw measurements as a function of depth within the borehole from which geophysical parameters of interest are computed as a function of depth within the borehole. It is quite common in the prior art to first combine raw data measurement and then to compute parameters of interest from these process measurements. A typical example is the computation of apparent resistivity from the difference in phase of signals detected at receivers at different longitudinal spacings from the transmitter. A second example is the computation of apparent resistivity from the ratio of the amplitude of signals detected at the longitudinally space receivers. Such preprocessing or data combination is performed primarily to eliminate the gross effects of the borehole and is well known in the prior art. No attempt is made in the prior art to simultaneously track systematic errors associated with the measurements of apparent resistivity.

The current invention provides means and methods for determining error which can be related to uncertainty associated with geophysical parameters measured with a downhole instrument of the type previously described. The user of the information, or "analyst", selects the parameters of interest which might include the resistivity (or conductivity) of the formation, the dielectric constant of the formation, or perhaps the degree to which drilling fluids invade the formation in the vicinity of the borehole. The analyst's primary interests are usually the determination of the hydrocarbon saturation, porosity and permeability of the formations penetrated by the borehole. It is highly desirable to make such measurements while drilling or soon after the drilling of the well borehole so that critical economic concerning the amount and producibility of hydrocarbons in place can be made. Based upon this information, the well will either be completed or abandoned. The accuracy and precision of geophysical parameters selected to make such critical decisions is also of prime importance. The error measurements provided by the current invention can also be used to indicate equipment malfunctions of both the electrical and mechanical types. Although prior art teaches means and methods of measuring a wide range of geophysical parameters using electromagnetic techniques, little, if any, emphasis is placed upon determining the quality of the measurements. Usually the analyst can only rely on past experience in assigning, at best, qualitative estimates of the quality of the measurements obtained from the borehole instrument and associated system. Any error analysis is usually performed long after the measurements are made and usually not at the well site. Stated another way, prior art does not provide means and methods for determining the quality of electromagnetic based geophysical measurements in real-time, although real-time or near real-time economic and operational decisions are made based upon these measurements.

There is critical need for quantitative indications of the quality of geophysical measurements made in formations penetrated measurements simultaneous with the measurements made in formations penetrated by a borehole. More particularly there is a need for such quality measurements simultaneous with the measurements of parameters of interest. This is especially true in electromagnetic type measurements of formation resistivity which weighs so heavily in decision to complete or abandon the well. The present invention provides this very information by providing means and methods for measuring geophysical parameters selected by the analyst and simultaneously yielding quantitative measurements of the quality or error associated with the measurements of the selected parameters.

SUMMARY OF THE INVENTION

This invention is directed toward the simultaneous measurement of a plurality of parameters associated with the formation and borehole environment, and a quantitative measure of the quality of such raw measurements or uncertainty associated with such raw measurements. Parameters of interest selected may include the resistivity of the formation from which hydrocarbon saturation is computed, invasion profiles of the drilling fluid which are indicative of the permeability of the formation, and perhaps physical characteristic of the well bore itself such as diameter, ellipticity, and rugosity. The borehole related parameters might be used by the analyst to determine, as an example, the rock mechanics of the formation. As discussed previously, errors associated with the measurements are critical in the decision concerning completion or abandonment of the well. Information concerning completion or abandonment of the well. Information concerning rock mechanics might guide the analyst in perforating after casing has been set or even in the design of hydraulic formation fracture operations subsequent to the setting of casing. The invention allows the analyst to choose parameters needed to make informed decisions as long as the total number of chosen parameters is less than thirty two for the preferred embodiment. Choices of parameters can vary from well to well depending upon need.

The borehole instrument comprises and elongated mandrel such as a steel drill collar in a measurement-while-drilling (MWD) embodiment of the invention. Two receivers comprising coils of one or more turns are wrapped around the outside diameter of the drill collar and spaced longitudinally near the center of the drill collar. Four transmitters comprising coils of one or more turns are wrapped around the outside of the drill collar and are spaced symmetrically in pairs on either side of the receiver array thereby forming eight transmitter receiver pairs. All transmitter and receiver coils are electrically insulated from the steel drill collar. Transmitters are activated sequentially at a first frequency. The phase and amplitude of the induced electromagnetic signal are measured yielding four measurements of amplitude and four measurement of phase each of the two receivers. The procedure is repeated at a second transmitter frequency yielding an additional four measurements of amplitude and four measurements of phase at each of the two receivers. The procedure is repeated at a second transmitter frequency yielding an additional four measurements of amplitude and four measurements of phase at each of the two receivers. Each sequence as described therefore yields thirty two independent, raw measurements. The measurement sequence is continuously repeated as the instrument is conveyed along the borehole. A mathematical model, which is based upon fundamental electromagnetic wave propagation properties, describes the theoretical response of the borehole instrument as a function of numerous formation and borehole parameters. Such parameters include formation resistivity, invasion parameters, formation bed boundary effects, borehole conditions and the like. The model contains fewer than thirty two variable parameters while the borehole instrument yields thirty two measured parameters as described previously. The system of unknown parameters is therefore "over determined" in the sense that there is more measured parameters than variable or unknown parameters to be determined. It should be noted that other transmitter-receiver-operating frequency combinations can be utilized. As an example, two transmitters at two operating frequencies would yield thirty two raw data measurements. One transmitter-receiver par with the transmitter operating at sixteen different frequencies would likewise yield thirty two raw data measurements. Furthermore, transmitter receiver-operating frequency combinations can be selected which yield more than thirty two raw data measurements, or fewer than thirty two raw data measurements so that the resulting system of equations is over determined.

Non-linear inversion techniques are used to determine the set of selected unknown parameters which, through the model, predicts a tool response which most closely matches the thirty two measured raw data points. The predicted tool responses and the measured tool responses will exhibit no discrepancies only if (a) there is no error associated with the measured data and (b) if the model represents without error the response of the instrument in every encountered borehole and formation condition. This is because there are more measured data points than unknown variable parameters in the model. Any degree of non-conformance or "mismatch" of the model data and the measured data is a measure of inaccuracy of either the data or the model or both the data and the model. In call cases the determined non-conformance is treated as a quality indicator for the determined parameters of interest. In other words, an uncertainty is attached to each parameter selected by the analyst based upon the goodness of fit between the model and the measured data.

BRIEF DESCRIPTION OF DRAWINGS

So that the manner in which the above cited features, advantages and object of the present invention are obtained and can be understood in detail, more particular description of the invention, briefly summarized above, may be had by reference to the embodiments thereof which are illustrated in the appended drawings. It is to be noted, however, that the appended drawings illustrate only typical embodiments of the invention and are therefore not to be considered limiting of the scope for the invention may admit to other equally effective embodiments.

DETAILED DESCRIPTION OF THE PREFERRED EMBODIMENT

Figure 1:
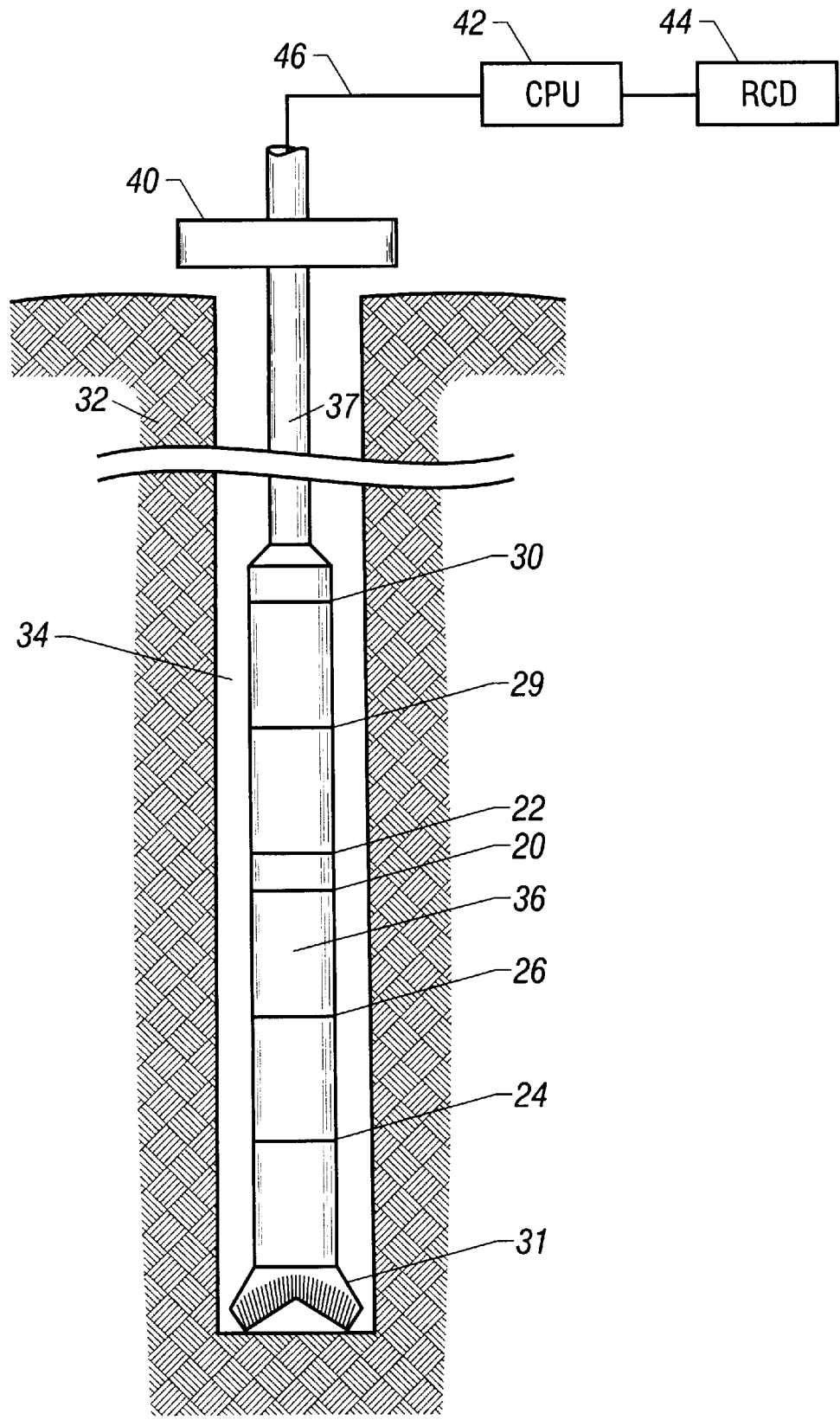
FIG. 1 illustrates the invention in a measurement while drilling (MWD) embodiment.

The invention maybe employed in a measurement while drilling (MWD) or wireline logging environment. The preferred embodiment in an MWD environment is illustrative in a very general manner in FIG. 1. The drill bit 31 is attached to a metallic drill collar 36 which in turn is mounted on the wellbore drilling string 37. This assembly shown suspended in a wellbore 34 which penetrates the earth formation 32. A means for rotating the drill string 37 is identified by the numeral 40. Four transmitter coils of one or more turns are identified by the numerals 26, 24, 29 and 30. The axis of the coils are coincident with the axis of the drill collar 36. The coils are electrically insulated from and slightly recessed within the outer diameter of the drill collar, thereby comprising integral elements of the collar assembly. Two receiver coils are identified by the numerals 20 and 22. The geometries of these coils are quite similar to the geometries of the transmitter coils and again comprise integral elements of the collar assembly 36. Power sources control circuitry for the transmitter and receivers are internal to the drill collar 36 and are not shown. Data recorded by the receivers can either be transmitted in real-time to the surface using drilling fluid pulsing means (not shown) contained within the drill collar 36 for a later retrieval. For the real-time data transmission embodiment, signals from the receivers are transmitted to the surface by a path means generally denoted by the numeral 46, transferred to CPU unit 42 for processing and correlated with depths from the drill collar depth indicator (not shown), and output to recorder 44 which displays the computed parameters of interest as a function of depth at which the input measurements were made. An alternate embodiment comprises a processor unit at a suitable location 40. mounted within the drill collar 36 to perform data processing downhole. Memory capacity and telemetry channel bandwidth is usually limited in MWD borehole devices. In order to utilize the limited memory capacity and telemetry channel bandwidth most effectively, it is often more efficient to process raw data downhole and store processed results rather than the more voluminous raw data.

Figure 2:
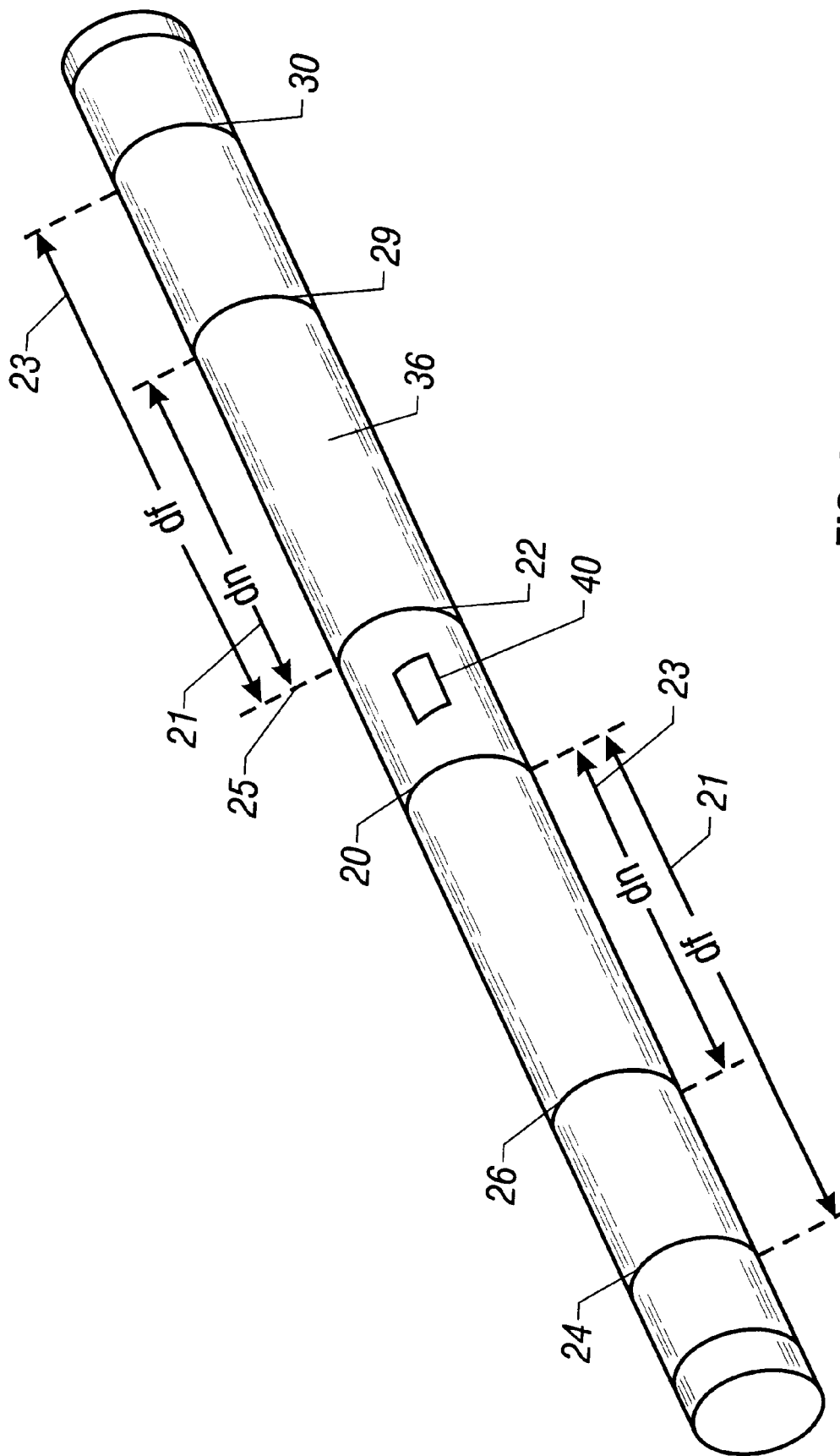
FIG. 2 illustrates in detail the drill collar comprising the transmitter and receiver coil arrays.

The drill collar comprising the transmitter receiver coil array is shown in greater detail in FIG. 2. The two receiver coils are denoted by the numerals 20 and 22. Transmitter coils 26 and 24 are longitudinally spaced distances 23 and 21, respectively, from the receiver 20. The transmitter coils 29 and 30 are likewise longitudinally spaced distances 21 and 23, respectively, from the transmitter 22. Again, power sources and control circuitry for the transmitters and receivers are contained within the drill collar and are not shown. The symmetrical spacing pattern of transmitters and receivers about a point 25 midway between receivers 20 and 22 is preferred but not a necessary condition for the embodiment of the invention.

Transmitters 24, 26, 29 and 30 are activated sequentially at a first frequency $\omega_1$. The phase and amplitude of the induced electromagnetic signal is measured at the receiver nearest to each activated transmitter thereby yielding four measurements of parameters will be identified as $A_i$ and $P_i$, respectively, where (i=1, . . . , 4). The procedure is repeated at a second frequency $\omega_2$ yielding an additional four measurements of amplitude and for measurements of phase, identified hereafter as $A_i$ and $P_i$, respectively, where (i=5, . . . ,8). The entire procedure is then repeated for the receiver farthest from each activated transmitter yielding values of $A_i$ and $P_i$ where (i=9, . . . ,16). In summary, a total count of thirty two parameters is measured by the borehole instrument. The above combined procedure of transmitting at frequencies $\omega_1$ and $\omega_2$, and recording received signals is repeated sequentially as the instrument is conveyed along the borehole.

Parameters of interest related to the formation, near borehole, and borehole are selected by the analyst. These parameters might include formation resistivity, formation dielectric constant, radius of invasion of the drilling fluid, resistivity of the drilling fluid and perhaps the diameter of the borehole. The selected number of parameters must be less than thirty two so that the system of equations described in the following sections is over determined thereby permitting uncertainty associated with the selected parameters to be determined. For purposes of illustration, it will be assumed that he analyst selects n parameters to be determined, where n is less than thirty two.

The processing of the data to obtain the parameters of interest and the determination of uncertainty associated with these parameters can best be described using matrix notation. The system is written as $$[T] \times [M] = [X] \quad (1)$$

where $$[T] = \begin{pmatrix} T_{1,1} & T_{1,2} & \ldots & T_{1,32} \\ \vdots & \vdots & & \vdots \\ T_{m,1} & T_{m,2} & \ldots & T_{m,32} \end{pmatrix} \quad (2)$$

$$[M] = \begin{pmatrix} A_1 \\ \vdots \\ A_{16} \\ P_1 \\ \vdots \\ P_{16} \end{pmatrix} \quad (3)$$

and $$[X] = \begin{pmatrix} X_1 \\ \vdots \\ X_m \end{pmatrix} \quad (4)$$

The matrix [T] represents the theoretical response of the borehole instrument calculated using appropriate electromagnetic modeling techniques for a broad range of formation and borehole conditions, the matrix [M] represents the thirty two raw data points measured by the borehole instrument, and the matrix [X] represents the formation and borehole parameters selected by the analyst to be determined. Although the solution of the matrix equation (1) to attain the desired parameters represented by the vector [X] is viewed as linear, in this case the element of the matrix [T] can be dependent upon the elements of [X]. The solution of equation (1) will, therefore, require a non-linear regression solution such as a ridge regression.

Once equation (1) has been solved for [X], an inverse matrix operation is performed to generate a synthetic matrix of the measured quantities denoted as [M']. That is, $$[T'] \times [X] = [M'] \quad (5)$$

where $$[\hat{T}] = \begin{pmatrix} \hat{T}_{1,1} & \hat{T}_{1,2} & \hat{T}_{1,m} \\ \vdots & & \\ \hat{T}_{32,1} & \hat{T}_{32,2} & \hat{T}_{32,m} \end{pmatrix} \quad (6)$$

and $$[\hat{M}] = \begin{pmatrix} \hat{A}_1 \\ \vdots \\ \hat{A}_{16} \\ \hat{P}_1 \\ \vdots \\ \hat{P}_{16} \end{pmatrix} \quad (7)$$

The mismatch between the measured parameters, [M], and the predicted values of the measured parameters [m̂] is a measure of quality of the parameters of interest, [X]. If $$[\hat{M}] \models [M] \quad (8)$$

then there is little uncertainty associated with the computed values [X] indicating that the quality of the measured data [M] and the model representing the response of the instrument [T] are both good.

If, however, $$[\hat{M}] \not\models [M] \quad (9)$$

it can be concluded that either the measured data [M] are of poor quality or the model of the tool response represented [T] is inadequate or both conditions have occurred. It has been determined that in many cases, the model is quite reliable and error in the model is only a minor contributor to the observed error. It follows, therefore that for these cases the observed error is usually attributable to equipment malfunctions. The degree of mismatch of [M'] and [M] is indicative of the magnitude of the uncertainty or error in the computed parameters of interest, [X]. Non-linear regression techniques suitable for application in this invention are described in the publication "Inversion of 2 MHZ Propagation Resistivity Logs" by W. H. Meyer, SPWLA 22nd Annual Logging Symposium, Jun. 14–17, 1992, Paper H.

One of the novel features of the present invention is based upon the great deal of redundancy in the measurements. Based on this redundancy, it is possible to make checks of the quality of the measurements and identify possible problems with particular combinations of sources and receivers. This is illustrated by the following example.

The starting point is, as before, equation (1). However, instead of using all the measurements, 32 in the case of equations (2) and (3), only a subset of the measurements are used. For example, only measurements 1–16 are used. In this case, the matrices [T] and [M] are given by:

$$[T] = \begin{pmatrix} T_{1,1} & T_{1,2} & \ldots & T_{1,16} \\ \vdots & \vdots & & \vdots \\ T_{m,1} & T_{m,2} & \ldots & T_{m,16} \end{pmatrix} \quad (10)$$

and $$[M] = \begin{matrix} A_1 \\ \vdots \\ A_8 \\ P_1 \\ \vdots \\ P_8 \end{matrix} \quad (11)$$

After solving equations 1, 10 and 11 for [X], the inverse matrix operation is performed according to equation (5) to get $$[\hat{M}] = \begin{matrix} \hat{A}_9 \\ \vdots \\ \hat{A}_{16} \\ \hat{P}_9 \\ \vdots \\ \hat{P}_{16} \end{matrix} \quad (12)$$

where $$[\hat{T}] = \begin{matrix} \hat{T}_{17,1} & \hat{T}_{17,2} & \dots & \hat{T}_{17,m} \\ \vdots & \vdots & & \vdots \\ \hat{T}_{32,1} & \hat{T}_{32,2} & \dots & \hat{T}_{32,m} \end{matrix} \quad (13)$$

By these operations, eight measurements of amplitude and phase are used to predict a value of the remaining eight measurements. A comparison between the actual and predicted value of the remaining eight measurements is a useful diagnostic. If the difference is small, then it indicates that the overall quality of the data measurements is satisfactory. If, however, the actual and predicted value of the remaining eight measurements is large, then there is something systematically wrong, either with some of the measurements or with the theoretical response of the borehole using electromagnetic modeling techniques. The subset of measurements used in derivation of the parameters of interest can correspond to a subset of the frequencies, a subset of the transmitters, a subset of the receivers, a subset of transmitter-receiver distances or any other subset. If a subset of transmitter-receiver distances is used to predict measurements of another subset of transmitter receiver distances and the errors are large, a likely cause of error lies in the modeling technique used in the theoretical response of the borehole. For example, if the borehole shape is elliptical whereas the model is based upon a circular borehole shape, a systematic error will result if data from one transmitter-receiver distance is used to predict measurements at another transmitter-receiver distance. Similarly, other environmental causes, such as changes in thickness of a mudcake inside the borehole will also lead to systematic errors as a function of transmitter-receiver distance.

If, however, no systematic error with transmitter-receiver distance is found, the modeling technique is reliable and the problem must lie elsewhere. By experimentation with various subsets, the source of an error can be identified with a particular transmitter, a particular receiver or a particular frequency oscillator.

The above description may make other alternate embodiments of the invention apparent to those skilled in the art. It is, therefore, the aim of the appended claims to cover all such changes and modification as fall within the true spirit and scope of the invention.

What is claimed is:

1. A method for determining parameters of interest relating to earth formations penetrated by a borehole and error associated therewith, comprising:

(a) providing a borehole instrument comprising a plurality of transmitter-receiver pairs, each said transmitter-receiver pair having a transmitter and receiver associated therewith;

(b) operating each transmitter of said transmitter-receiver pairs at at least one operating frequency, thereby inducing electromagnetic radiation within the formation and the borehole;

(c) measuring amplitude and phase of electromagnetic radiation detected by the receiver of each said transmitter-receiver pair at the at least one said operating frequency, thereby obtaining a set of measurements comprising amplitude measurements and phase measurements at the at least one said operating frequency;

(d) providing a model which relates said set of measurement to the parameters of interest;

(e) selecting the parameters of interest which are to be determined;

(f) obtaining an estimate of said selected parameters of interest by combining the model with a first subset of measurements selected from the set of measurements wherein the number of the selected parameters of interest is less than the number of measurements in the first subset of measurements;

(g) obtaining a predicted value of a second subset of measurements using said estimate of said selected parameters; and (h) determining an error associated with said selected parameters of interest by utilizing a difference between said predicted value of the second subset of measurements and the second subset of measurements.

2. The method of claim 1, wherein said plurality of transmitter-receiver pairs comprises eight combinations of transmitters and receivers, and wherein the at least one operating frequency comprises a second frequency, thereby yielding at least thirty two measurements comprising sixteen measures of phase and sixteen measures of amplitude.

3. The method of claim 2, wherein the eight combinations of transmitters and receivers further comprises four transmitters and two receivers.

4. The method of claim 1, wherein obtaining a predicted value of a second subset of measurements further comprises:

(i) formulating said model in the form of a model matrix;

(ii) formulating said first subset of measurements of said set of measurements in the form of a first data matrix;

(iii) formulating said second subset of measurements of said set of measurements in the form of a second data matrix;

(iv) multiplying said model matrix by said first data matrix to obtain a parameter matrix which represents values of the parameters of interest to be determined;

(v) performing an inverse matrix operation to generate a matrix of expected measurements from the product of the inverse of said model matrix and said parameter matrix.

5. The method of claim 2 wherein the first subset of measurements comprises all the measurements from the set of measurements having one of: (i) a selected transmitter, (ii) a selected receiver, (iii) a selected transmitter-receiver spacing, and (iv) a selected frequency.

6. A method for determining the values of a plurality of predetermined parameters of interest from measurements made by an electromagnetic wave propagation tool in a wellbore, said method comprising:
 (a) making a plurality of raw measurements by said electromagnetic wave propagation tool in the wellbore;
 (b) estimating the value of each said parameter of interest utilizing a first subset of the raw measurements from the plurality of raw measurements;
 (c) determining the expected values of a second subset of raw measurements of the plurality of raw measurements from the estimated values of the parameters of interest; and
 (d) determining a quantitative measure of the quality of the raw measurements from the determined expected values of the raw measurements.

7. The method of claim 6 wherein the number of raw measurements comprises 16 measurements of amplitude and 16 measurements of phase.

8. The method of claim 6 wherein the electromagnetic wave propagation tool comprises eight combinations of transmitters and receivers.

9. The method of claim 6 wherein the first subset of raw measurements comprises all the measurements from the set of raw measurements having one of: (i) a selected transmitter, (ii) a selected receiver, (iii) a selected transmitter-receiver spacing, and (iv) a selected frequency.

10. A wave propagation apparatus for determining parameters of interest relating to earth formations penetrated by a borehole and errors associated with the determination of said parameters of interest, comprising:
 (a) at least one transmitter for generating electromagnetic waves into the formation at at least one frequency;
 (b) at least one receiver, said at least one receiver making a plurality of measurements corresponding to phase and amplitude of electromagnetic waves propagating into the formation; and
 (c) a processor for controlling the transmitter and receiving measurements from the receiver, said processor being adapted to
   (i) determine the parameters of interest from a first subset of the plurality of measurements; and
   (ii) estimate a value of a second subset of the plurality of measurements from the parameters of interest.

11. The wave propagation of claim 10 wherein the processor is further adapted to determine an error associated with the parameters of interest from the estimated and measured values of the second subset of the plurality of measurements.

12. The wave propagation of claim 10 wherein the processor is further adapted to determine an error associated with the second subset of the plurality of measurements.

13. The wave propagation apparatus of claim 10, wherein said apparatus is conveyable into the borehole by a conveyance system selected from the group consisting of a wireline, coiled tubing, and jointed tubulars.

14. The wave propagation apparatus of claim 10 wherein the processor is downhole.

15. The wave propagation apparatus of claim 10 wherein the at least one transmitter comprises four transmitters and the at least one receiver comprises two receivers.

16. The wave propagation apparatus of claim 10 wherein the at least one frequency comprises two frequencies.

17. The wave propagation apparatus of claim 10 wherein the first subset of measurements comprises all the measurements from the set of measurements having one of: (i) a selected transmitter, (ii) a selected receiver, (iii) a selected transmitter-receiver spacing, and (iv) a selected frequency.

* * * * *